United States Patent Office

3,243,692
Patented Mar. 29, 1966

3,243,692
TRAVEL-RESPONSIVE SENSING DEVICE, PARTICULARLY FOR CONTROL OF FABRICATING MACHINERY
Walter Heissmeier and Christian-Friedrich Wolf, Nurnberg, Germany, assignors to Siemens-Schuckertwerke Aktiengesellschaft, Berlin-Siemensstadt, Germany, a corporation of Germany
Filed July 2, 1962, Ser. No. 206,837
Claims priority, application Germany, July 1, 1961, S 38,105
10 Claims. (Cl. 323—94)

Our invention relates to travel-responsive sensing devices particularly, but not exclusively, for the control of machine tools and other fabricating equipment.

Various types of sensing and measuring devices are known for measuring, controlling and regulating translatory and rotary motion, such as the feed motion in machine tools. Some of these devices operate on optical principles, requiring a transparent measuring scale illuminated from one side and responded to at the other side by an optical sensor such as a photoelectric cell. Other known devices are of the magnetic type and require a signal carrier with impressed remanent magnetization. In optical systems the scale member must be accessible from both sides. Magnetic measuring devices as heretofore known are susceptible to trouble by spurious magnetic fields. Also known are travel-responsive systems operating on the rotary-motion transmission or synchro principle of the electrical type which can also be used for response to translatory motion if the synchro system is employed in planar development. In the latter case, however, movable connecting cables or slip rings are required at the moving component of the system, aside from the fact that a relatively large number of internal connections are necessary for the synchro system. In addition, the low signal level as compared with the noise level of these sensing devices unfavorably affects their use for many purposes.

It is an object of our invention to provide a travel-responsive measuring or sensing system that avoids all of the above-mentioned shortcomings inherent in the known systems, and to devise a simplified sensing system of reliable operation that requires only one side of a reference structure to be accessible to a sensor while securing a high signal-to-noise ratio.

Another object, akin to the one mentioned, is to devise a travel-responsive sensing device directly suitable for digital measuring control and regulating purposes by translating the travel responded to into a sequence of number pulses.

Still another object of our invention, in conjunction with those mentioned above, is to provide a travel-responsive sensing device of particularly high resolving power which will reliably respond to very small changes in travel position.

When a body of iron or the like ferromagnetic material passes by the air gap of an essentially close magnetic circuit which is magnetically excited and contains a Hall generator in its flux path, the voltage produced by the Hall generator is varied due to the change in reluctance caused by the passage of the iron at the air gap. This variable-reluctance principle has been found usable in magnetic limit switches, in axle counting device of railroad signal and blocking systems and similar purposes.

According to our invention we provide the sensing device with a raster member having a line raster of magnetizable high-permeability material, the raster lines extending transverse to the direction of travel to be responded to and being regularly spaced from each other. We further provide the device with a sensor member which, during operation, is movable along the raster member, or vice versa. The sensor member comprises a magnetic circuit which forms a sensing gap or air gap close to the raster so that this gap becomes magnetically bridged to a greater or smaller extent by the raster to repetitively vary the reluctance of the magnetic circuit as the gap passes by respective lines and interstices of the raster. The magnetic circuit of the sensor member is energized by a magnet which may consist of a permanent magnet or an electromagnet and contains a Hall generator whose semiconductor Hall plate is mounted in the flux path of the magnetic circuit so that the output voltage of the Hall generator varies periodically in dependence upon the raster-responsive reluctance variation of the magnetic circuit. At any moment during the travel responded to, the Hall voltage depends upon the degree of bridging caused by the raster lines across the sensing gap and hence is dependent upon the position of the sensor member or read-off head relative to the raster member.

Since the raster member, which virtually constitutes the "measuring stick" of the device does not comprise impressed permanent or remanent magnetization and hence operates in a passive manner, spurious or extraneous magnetic fields remain ineffective to a great extent. The raster member need be accessible to the sensor member only from the side of the raster lines and requires no electrical connections. The raster member can be made in any desired size and can be cut to any desired shorter length so that it can be readily adapted to the length of a particular machine and need not correspond to a given multiple of length units. For magnetic excitation of the transducer head, a permanent magnet may be arranged in the flux path of the magnetic circuit. In lieu thereof, the sensor head may be excited electromagnetically by direct current or alternating current depending upon the particular measuring control or regulating purpose of the device.

The soft-magnetic line raster can be produced by attaching a soft-magnetic foil of high magnetic permeability by means of a suitable cement upon a non-magnetic base plate. Another method of producing the raster member is by means of photographic transfer of the line-grid onto a base member and subsequently etching the member. This method is similar to that employed in the production of etched electric circuits and affords producing a raster scale division that can readily be given a resolution down to 1 mm. and less. If still higher resolution is required, difficulties in the production of the raster member may result from the extremely slight spacing between adjacent lines, and corresponding difficulties may arise from such fine line spacing during the sensing or measuring performance. In such a case, however, the resolving power of the device can be more reliably increased by providing the device with a plurality of transducer heads each having its own excited magnetic circuit with a sensing gap and a Hall generator, the sensing gaps of the transducer heads being spaced from each other a fixed distance differing in accordance with the desired resolving power from a line spacing of the raster.

The foregoing and more specific features of our invention as well as the above-mentioned and other advantages achieved thereby will be described in the following with reference to the embodiments of sensing devices according to the invention illustrated by way of example in the accompanying drawings, in which.

Figures 1, 2:
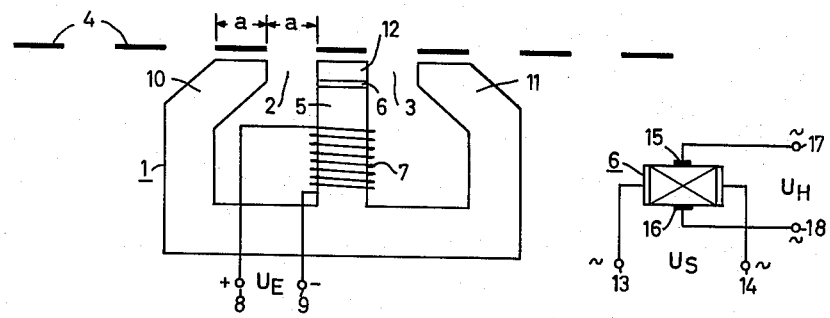
FIG. 1 is a lateral view of a transducer head or sensing member together with a schematic illustration of the appertaining raster member.
FIG. 2 is a schematic circuit diagram of the Hall generator that forms part of the sensor member according to FIG. 1.

The sensor member or "head" according to FIG. 1 comprises a magnetic circuit constituted by an approximately E-shaped core of soft-magnetic material, i.e. a material of high magnetic permeability. The magnetic circuit has two sensing gaps 2 and 3 located between the middle leg and the respective outer legs of the E-shaped core. The two sensing gaps 2 and 3 are spaced from each other a distance equal to twice the unit spacing "$a$" of the raster division. The spacing between the two sensing gaps (or their respective mid-points) may also be any other even multiple of the two length units "$a$" so that the two sensing gaps are simultaneously opposite a line 4 of the raster or are simultaneously opposite an interspace of the raster. The illustrated size of the line raster in FIG. 1 is purposely greatly exaggerated and so is the corresponding width of the sensing gaps 2 and 3 whose mid-point spacing corresponds to $2a$.

The middle leg 5 of the magnetic circuit 1 is provided with a narrow air gap in which the semiconductor Hall plate 6 of a Hall generator is located. The same middle leg carries an excitation winding 7 to provide electromagnetic excitation. The winding 7 is energized at terminals 8 and 9 by excitation voltage $U_E$ supplied, for example, from a suitable source of constant direct voltage (not illustrated). The two pole shoes 10 and 11 of the magnetic circuit have respective pole faces opposite the line raster whose area is approximately of the same size as the pole face at the end 12 of the middle leg 5. When employing a line raster whose actual line division $a=1$ mm., the middle leg 5 is preferably given a thickness equal to an odd multiple of the line spacing "$a$" so that with the illustrated sensor design the two sensing gaps 2 and 3 are opposite respective raster lines or interstices.

The electric connections of the Hall generator are schematically indicated in FIG. 2. The Hall plate 6 of the generator circuit receives a controlling alternating-current voltage $U_S$ from terminals 13 and 14. The generated Hall voltage $U_H$, which is also an alternating voltage, is available at the Hall electrodes 15 and 16. Suitable receiving devices can thus be connetced to the output terminals 17 and 18, for example pulse-transformer stages or digital counting circuits.

The performance of the sensing device according to FIG. 1 is based upon the fact that the magnetic circuit is substantially closed through the sensing gaps only when these gaps are substantially bridged by raster lines 4. In this case, the Hall voltage $U_H$ at the output terminals 17 and 18 is a mixumum. However, when the sensing gaps 2, 3 are not bridged at all, this being shown in FIG. 1, then the Hall voltage at terminals 17 and 18 is a minimum. Consequently, minimum and maximum of the Hall voltage follow each other during relative motion of the sensing member in a sequence corresponding to one line division "$a$" so that with the aid of a suitable counting device the total travel path can be determined in digital or integrating manner.

In principle, the type of excitation and the supply of current to the Hall generator may be of any kind. The excitation current at terminals 8, 9 as well as the control current at terminals 13, 14 may be direct current so that the resulting output voltage at terminals 17 and 18 is also a direct voltage. For some purposes, however, it is preferable to produce an alternating output voltage which is amplitude-modulated in accordance with the relative displacements of the sensing member. In this case, the excitation of either terminals 8, 9 or terminals 13, 14 by alternation voltage will result in the desired modulated output. The electromagnetic excitation of the sensing member and the supply of control current at terminals 13 and 14 of the Hall generator are limited, as to power input, only by constructional data, so that a relatively high signal voltage $U_H$ and a correspondingly high signal-to-noise ratio can be obtained.

Figure 3:
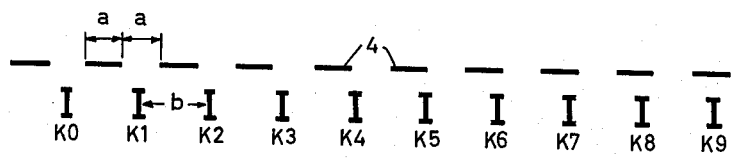
FIG. 3 is a diagrammatic representation of a sensing device with a multiplicity of sensors cooperating with a single raster for increased resolution.

To avoid technological difficulties, it is generally preferable to carry the resolution of the raster not below a line division of about 0.1 mm. For nevertheless obtaining a response of higher resolving power, a plurality of sensor heads can be provided as is schematically indicated in FIG. 3. According to this embodiment a total of ten sensor members K0 to K9 are provided and rigidly interconnected, each of them corresponding, for example, to the sensing member illustrated in FIGS. 1 and 2 and described above. The individual sensing heads are displaced from each other along the raster member a distance corresponding to the line division and a given fraction of that division. In FIG. 3 only the symmetry axes of the respective sensing heads are indicated by heavy vertical lines. These symmetry axes are spaced from each other the uniform distance $b$ resulting from the raster division "$a$" of, for example 1 mm., and from the desired resolving power $k$ as follows:

$$b = n \cdot a - k$$

wherein $n=1, 2, 3 \ldots$ and is a multiplying factor. For the required resolving power of $k=0.1$ mm., the value of $b$ is 0.9 mm. In other words, according to FIG. 3, the symmetry axes of the individual sensor heads are displaced from the mid-points of the corresponding raster interstices by $n/9$ of the line spacing "$a$." In view of the space requirement of the individual heads, the schematic arrangement according to FIG. 3 cannot be realized as shown but it is necessary to provide between each two heads an additional spacing of any desired even multiple of "$a$." In principle, however, the individual sensor heads can be mounted beside each other but displaced the above-mentioned amount $b$ relative to each other, and the entire group of heads can then be displaced relative to a raster member whose width corresponds to the total width of the group of heads.

When the entire group of heads are displaced the distance $2a$ relative to the raster member, the ten sensor members K0 to K9 will issue a total of ten successive maxima or corresponding pulses. The maxima or corresponding pulses are counted. Counting may be accomplished for example by connecting the Hall voltage output in each sensor by means of amplifiers to pulse generators responding to the respective voltage maxima. These generators can be connected to a common output.

Figure 3A:
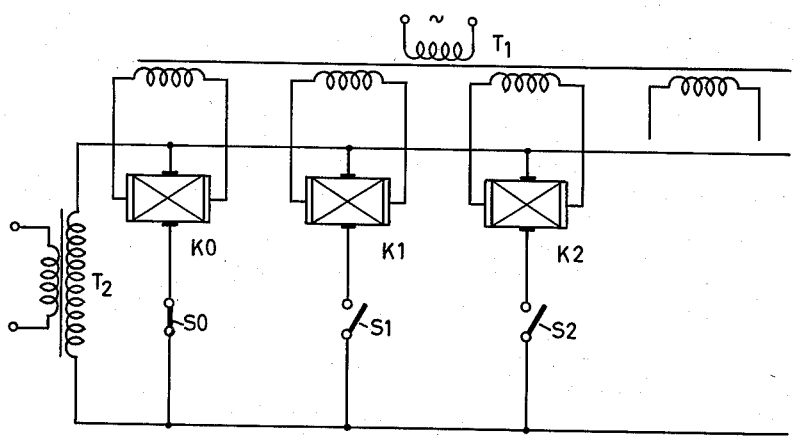
FIG. 3a is a schematic representation of a circuit interconnecting the Hall voltage devices for a multiplicity of sensors cooperating with a single raster according to FIG. 3.

Another way of utilizing the voltage maxima or corresponding pulses generated by the ten sensor members according to FIG. 3 is to assign a particular value which the raster is to move relative to the sensors (or vice versa). The first sensor head K0 indicates by its pulse voltage the value 0, or .10 and hence the penultimate decimal of any number counted. When this decimal is determined, then the receiver device is switched for response to the head assigned to the ultimate decimal. This is done by switching in the excitation circuit or in the control circuit of the Hall generator or in the receiving device. For example, if the head for the ultimate decimal is the one denoted by K4, then this head, after it is placed in ready condition by switching, does not yet furnish the maximum of its Hall voltage. This maximum voltage occurs only when the symmetry axis of the head K4 coincides with the middle between two raster lines 4. For this purpose, the sensor head K4 must travel an additional distance of 0.4 mm. In this embodiment, too, the control current at the terminals 13, 14 of the respective sensor heads or the excitation current at terminals 8, 9 of the rsepective heads may be supplied as alternating current which facilitates further use of the output voltage by transformation and through alternating-voltage amplifiers. The circuit for accomplishing the above is shown in FIG. 3a where three of the ten Hall generators corresponding to the sensors of FIG. 3 are shown. The respective switches S0, S1, S2 . . . each serve to connect the respective Hall voltages in sensors K0, K1, K2 . . . to the transformer T2. The transformer former T1 energizes each Hall voltage generator.

For producing the raster, the magnetic material of the raster member can be provided with line-shaped recesses in uniform distances from each other so that the remaining intermediate ridges constitute the line raster proper.

The recesses can be produced mechanically, for example by milling, punching and the like. Another way of production is to transfer the line raster photographically upon the rod-shaped member and to produce the recesses or grooves by etching. For this method a soft-magnetic foil, for example of Mu-metal, can be cemented in face-to-face relation to a non-magnetic support. After photographic transfer and etching, only the ridges remain in the foil so that the depth of the intermediate recesses corresponds to the original foil thickness. The depth of the recesses may be in the order of about 30 to 50 microns.

Still another method of producing the raster member is to place ridges upon a supporting member, for example by deposition of magnetically conducting layers in form of the desired line raster.

However, the raster member may also be made completely of magnetizable material and its surface may be provided with grooves. The individual ridges that remain between the grooves are then connected with each other by magnetically conducting material, but a sufficient signal level in the output voltage of the sensor head is nevertheless obtained.

In measuring rasters according to the decimal system, the recesses between the raster ridges or lines are preferably given a spacing of 1 mm. In principle, however, any other mutual spacing is applicable, a smaller spacing, however, being preferably not less than about 0.1 mm. for practical reasons.

Figure 4:
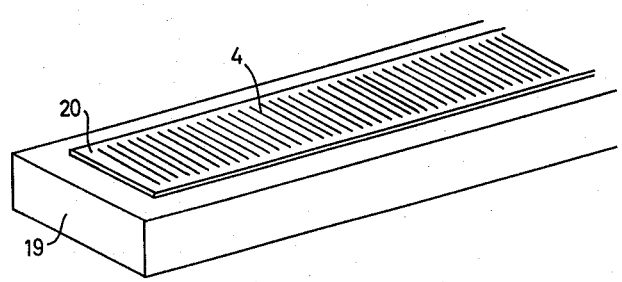
FIG. 4 is a perspective illustration of a raster member according to FIGS. 1 and 3.

According to the raster member shown in FIG. 4, a non-magnetic rod 19 of rectangular cross section consisting of non-magnetic metal such as brass or austenitic steel carries on its top surface a soft-magnetic foil 20 which is cemented to the support 19 by means of an intermediate adhesive foil and is provided with the line raster 4. In the sectional view of the same embodiment shown in FIG. 5, the intermediate cementing foil is denoted by 21, the ridges of the raster by 22 and the interstices of the raster by 23.

Figures 5, 6:
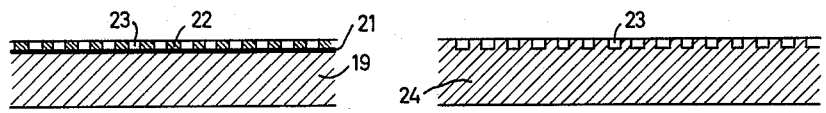
FIG. 5 is a cross section through the raster member of FIG. 4.
FIG. 6 is a sectional view of another raster member.

The raster member according to FIG. 6 consists entirely of magnetizable material 24 which is provided with straight grooves 23 so that the intermediate ridges constitute the line raster.

Figure 7:
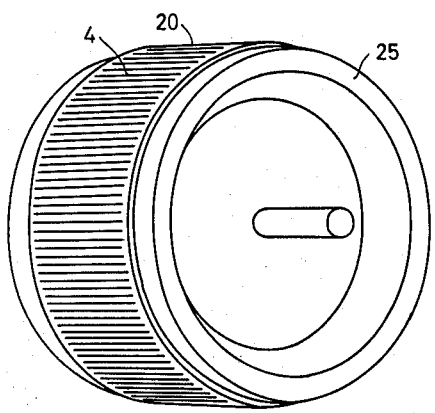
FIG. 7 shows in perspective a raster member of cylindrical shape.

The raster rods can be cut to any desired length so that they are easily adaptable to the travel length of the particular machinery with which the device is to be used. When rotary travel is to be measured or controlled, the raster member can be given the shape of a drum or disc as indicated in FIG. 7. The illustrated drum 25 consists of non-magnetic material whose peripheral surface carries a soft-magnetic foil 20 with the line raster 4.

In some cases a separate raster support is not necessary, because the line rasted itself can be produced on the bed structure or slider structure of a machine itself, such as on the tool support of a lathe or other workpiece supporting structure whose travel is to be controlled by the sensing device.

To those skilled in the art, it will be obvious upon a study of this disclosure that our invention affords of a variety of other modifications with respect to design details and particular application, and hence can be given embodiments other than particularly illustrated and described herein, without departing from the essential features of our invention and within the scope of the claims annexed hereto.

We claim:

1. A travel-responsive sensing device, particularly for control of fabricating machinery, comprising a raster member having a soft-magnetic line raster including spaced raster lines and a sensor member, one of said members being movable relative to the other, said sensor member having a magnet with a magnetic circuit forming a sensing gap equal in width to the spacing from one raster line to the next and being close to said raster to be magnetically bridged by a line of said raster, and a Hall generator having a Hall plate mounted in the flux path of said magnetic circuit and having an output voltage dependent upon the degree of bridging of said sensing gap by a line of said raster and hence upon the position of said sensor member relative to said raster member, said output voltage having a maximum value when said sensing gap is bridged by a line of said raster and a minimum value when said sensing gap is bridged by a space of said raster.

2. In a travel-responsive sensing device according to claim 1, said raster member comprising a body of soft-magnetic material having strip-shaped grooves transverse to the travel direction so that the intermediate ridges constitute said line raster.

3. In a travel-responsive sensing device according to claim 1, said raster member comprising a body of non-magnetic material, a foil of magnetizable soft-magnetic material cemented to said body in face-to-face relation thereto, and recesses interrupting said foil transversely to the travel direction and in regular intervals so that the strip-shaped foil portions constitute said line raster.

4. In a travel-responsive sensing device according to claim 1, said raster member having recesses transverse to the travel direction and intermediate ridges which form said line raster, said recesses being spaced about 1 mm. from each other.

5. In a travel-responsive sensing device according to claim 1, said raster member having recesses transverse to the travel direction and intermediate ridges which form said line raster, said recesses being spaced from each other at least about 0.1 mm. and having a depth of about 30 to about 50 microns.

6. A travel-responsive pulse-generating device, comprising a raster member and a sensor member movable relative to one another, said raster member having a line raster of magnetizable high-permeability material with a regular line spacing along the path of relative motion, said sensor member having magnet means comprising a magnetic circuit with a sensing gap equal in width to the spacing from one raster line to the next and being close to said raster to repetitively vary the reluctance of said circuit as said gap passes by respective lines and interstices of said raster, and electric circuit means having a magnetic field-responsive Hall generator mounted in the flux path of said magnetic circuit to provide output voltage pulses in dependence upon the raster-responsive reluctance variation of said magnetic circuit, said output voltage having a maximum value when said sensing gap is bridged by a line of said raster and a minimum value when said sensing gap is bridged by a space of said raster.

7. A travel-responsive sensing device, particularly for control of fabricating machinery, comprising a raster member having a soft-magnetic line raster including spaced raster lines and a sensor member, one of said members being movable relative to the other, said sensor member having an electromagnet which comprises a core structure forming an essentially closed magnetic circuit with a sensing gap equal in width to the spacing from one raster line to the next and being close to said raster to be magnetically bridged thereby, said electromagnet having an electric coil circuit, a Hall generator having a Hall plate in the flux path of said magnetic circuit and having an energizing electric circuit connected to said Hall plate, said Hall plate having an output circuit whose instantaneous output voltage is dependent upon the degree of bridging of said sensing gap by said raster, said output voltage having a maximum value when said sensing gap is bridged by a line of said raster and a minimum value when said sensing gap is bridged by a space of said raster.

8. A travel-responsive pulse-generating device, comprising a raster member and a sensor member movable relative to one another, said raster member having a line raster of magnetizable high-permeability material with a regular line spacing along the path of relative motion, said sensor member having magnet means comprising a three-legged core structure having two sensing gaps between the middle leg and the respective outer legs, said gaps being equal in width to the spacing from one raster line to the next and being close to said raster for varying the magnetic reluctance relative to the middle leg as said core passes by respective lines and inter-spaces of said raster, and a Hall generator having a Hall plate joined with said middle leg to provide output voltage pulses in dependence upon the raster-responsive reluctance variation, said output voltage having a maximum value when said sensing gap is bridged by a line of said raster and a minimum value when said sensing gap is bridged by a space of said raster.

9. A travel-responsive pulse-generating device according to claim 8, comprising a magnet excitation coil on said middle leg of said core structure, said two sensing gaps having their respective mid-points spaced from each other an even multiple of the raster-line division.

10. A travel-responsive sensing device, particularly for control of fabricating machinery, comprising a raster member having a soft-magnetic line raster including spaced raster lines and a group of sensor members haivng normally fixed positions relative to each other, said raster member and said group being movable one relative to the other, each of said sensor members having a magnet with a magnetic circuit forming a sensing gap equal in width to the spacing from one raster line to the next and being close to said raster to be magnetically bridged by a line of said raster, a Hall generator having a Hall plate mounted in the flux path of each of said magnetic circuits and having an output voltage dependent upon the degree of bridging of said sensing gap by a line of said raster, and said sensing members of said group being spaced from each other in the travel direction a determined distance including a fraction of the space between the raster lines for increasing the resolving capacity of the sensing device.

References Cited by the Examiner

UNITED STATES PATENTS

| | | | |
|---|---|---|---|
| 2,590,091 | 3/1952 | Devol | 336—132 |
| 2,845,710 | 8/1958 | Claret et al. | 33—125 |
| 2,905,874 | 8/1959 | Kelling | 324—34 |
| 2,918,666 | 12/1959 | Brower et al. | 33—125 |
| 3,012,233 | 12/1961 | Greanias | 324—34 |
| 3,028,092 | 4/1962 | Fay | 324—45 |

FOREIGN PATENTS 847,158    9/1960   Great Britain.

OTHER REFERENCES

Bulman: Electronic Design, "Hall-Effect Generators," March 4, 1959, pp. 28–41.

LLOYD McCOLLUM, *Primary Examiner.*

A. D. PELLINEN, D. L. RAE, *Assistant Examiners.*